United States Patent
Howells et al.

(10) Patent No.: US 12,130,032 B2
(45) Date of Patent: Oct. 29, 2024

(54) COMPACT DUCT DETECTORS FOR HVAC SYSTEMS

(71) Applicant: Apollo America Inc., Auburn Hills, MI (US)

(72) Inventors: Dale Howells, Auburn Hills, MI (US); Hemal Shahporia, Auburn Hills, MI (US); Matthew Szafranski, Troy, MI (US)

(73) Assignee: Apollo America, Inc., Auburn Hills, MI (US)

( * ) Notice: Subject to any disclaimer, the term of this patent is extended or adjusted under 35 U.S.C. 154(b) by 355 days.

(21) Appl. No.: 17/448,743

(22) Filed: Sep. 24, 2021

(65) Prior Publication Data
US 2023/0109770 A1 Apr. 13, 2023

(51) Int. Cl.
*F24F 11/33* (2018.01)
*F24F 11/526* (2018.01)
(Continued)

(52) U.S. Cl.
CPC ............ *F24F 11/33* (2018.01); *F24F 11/526* (2018.01); *F24F 11/88* (2018.01); *F24F 11/89* (2018.01);
(Continued)

(58) Field of Classification Search
CPC ......... F24F 11/33; F24F 11/526; F24F 11/88; F24F 11/89; F24F 2110/64;
(Continued)

(56) References Cited

U.S. PATENT DOCUMENTS 5,844,148 A * 12/1998 Klein ................. G01N 1/2226
 73/864.81
8,225,656 B2 7/2012 Kato et al.
(Continued)

FOREIGN PATENT DOCUMENTS

WO WO-2008109933 A1 * 9/2008 ............. G01N 15/06
WO WO-2013024935 A1 * 2/2013 ............... A62C 3/10

OTHER PUBLICATIONS

Partial European Search Report issued in EP Application No. 22197600.4, 16 pages, dated Feb. 15, 2023.

*Primary Examiner* — Edelmira Bosques
*Assistant Examiner* — Frances F. Hamilton
(74) *Attorney, Agent, or Firm* — DLA Piper LLP US

(57) ABSTRACT

A duct detector may include a detection chamber and a control circuitry stacked vertically on top of the detection chamber. A sealing gasket may seal a contact between a substrate of the control circuitry (e.g., the seal may be at the bottom surface of a printed circuit board containing the control circuitry) and the detection chamber such that particles analyzed the detection chamber may not damage the control circuitry. Therefore, by providing a sealed barrier between the control circuitry and the detection chamber, the sealing gasket allows for stacking the control circuitry and the detection chamber. As the seal does not create a barrier (the barrier is for the detection chamber) for a repair personnel to access the control circuitry, repairs to the duct detectors may be easier because the seal may not have to be broken and resealed during the repair process.

16 Claims, 13 Drawing Sheets

(51) Int. Cl.
*F24F 11/88* (2018.01)
*F24F 11/89* (2018.01)
*F24F 110/64* (2018.01)
*F24F 110/70* (2018.01)
*F24F 110/72* (2018.01)
*F24F 110/76* (2018.01)
*G01D 11/24* (2006.01)

(52) U.S. Cl.
CPC ........ *G01D 11/245* (2013.01); *F24F 2110/64* (2018.01); *F24F 2110/70* (2018.01); *F24F 2110/72* (2018.01); *F24F 2110/76* (2018.01)

(58) Field of Classification Search
CPC ............... F24F 2110/70; F24F 2110/72; F24F 2110/76; G08B 17/113; G08B 17/10
USPC .......................................................... 454/539
See application file for complete search history.

(56) References Cited

U.S. PATENT DOCUMENTS

| | | | |
|---|---|---|---|
| 9,257,027 B2 | 2/2016 | Williamson | |
| 9,792,793 B2 | 10/2017 | Baxendell et al. | |
| 2005/0057367 A1 | 3/2005 | Regh | |
| 2006/0027353 A1* | 2/2006 | Luthi | F24F 11/30 165/11.1 |
| 2006/0114112 A1* | 6/2006 | Cole | G08B 17/113 340/630 |
| 2009/0056929 A1* | 3/2009 | Mulder | F24D 13/04 700/275 |
| 2009/0266183 A1* | 10/2009 | Hall | G01R 35/00 73/865.9 |
| 2011/0081852 A1* | 4/2011 | Sahibzada | G01F 5/00 454/256 |
| 2012/0193086 A1* | 8/2012 | van Dijk | G01K 1/14 374/185 |
| 2016/0294446 A1* | 10/2016 | Rumler | H04B 5/0037 |
| 2020/0033017 A1* | 1/2020 | Brown | G01N 33/0009 |

* cited by examiner

100

100

100

100

100

100

302

302

302

306

306

306

306

306

308a

308a

308a

308b

308b

308b

310a

310a

310b

310b

312

312

312

312

314

314

314

314

COMPACT DUCT DETECTORS FOR HVAC SYSTEMS

TECHNICAL FIELD

This disclosure relates to detectors for HVAC (Heating, Ventilation, and Air Conditioning) systems, more particularly to duct detectors for detecting harmful particles and/or harmful gases in air circulating through HVAC ductwork.

BACKGROUND

Large commercial buildings' HVAC system may have complex ductwork in order to circulate air throughout the buildings. During fires however, the HVAC systems may pull in room smoke through the return grilles and thereby cause the smoke to be mixed with the circulating air. Therefore, in case of a fire, the complex ductwork system designed for an optimum air circulation can facilitate circulation of smoke. To detect the smoke circulating in the ductwork, duct detectors are deployed. Currently available duct detectors tend to be large and bulky and therefore have reduced usability, especially in tighter spaces. Repairability is also an issue for currently available duct detectors: to repair a control circuitry, sealed components may have to be damaged and then the damaged seal may have to be replaced/resealed.

SUMMARY

What is therefore desired are duct detectors with a reduced footprint and therefore more amenable to being used in tight spaces. What is further desired are duct detectors that provide easier repairability despite having such smaller footprint.

Examples disclosed herein may solve these problems and may provide solutions to other problems as well. An example duct detector may include a detection chamber and a control circuitry stacked vertically on top of the detection chamber. A sealing gasket may seal the contact between the substrate of the control circuitry (e.g., the seal may be at the bottom surface of a printed circuit board containing the control circuitry) and the detection chamber such that particles analyzed the detection chamber may not damage the control circuitry. Therefore, by providing a sealed barrier between the control circuitry and the detection chamber, the sealing gasket allows for a reduced footprint of having the stacked control circuitry and the detection chamber. As the seal does not create an barrier (the barrier is for the detection chamber) for a repair personnel to access the control circuitry, repairs to the duct detectors may be easier because the seal may not have to be broken and resealed during the repair process.

In an embodiment, a detector includes a detection chamber configured to receive an air sample; a sensor configured to detect a particle level in the air sample and generate a detection signal based on the particle level; a control circuitry configured to receive the detection signal and generate a communication signal or a control signal based on the received detection signal, wherein the control circuitry is disposed vertically above the detection chamber; and a sealing gasket that seals the control circuitry from the detection chamber.

In another embodiment, a system includes a first detector configured to operate as a parent detector and a second detector, in communication with the first detector and configured to operate as a child detector, the first detector including: a detection chamber including a first sensor configured to detect a first particle level in a first air sample; a control circuitry disposed vertically above the detection chamber and configured to generate first signal based on the detected particle level; a sealing gasket that seals the control circuitry from the detection chamber; the second detector including: a second sensor configured to detect a second particle level of the in a second air sample; and the control circuitry in the first detector further configured to: generate a second signal based on the second particle level detected by the second sensor.

This summary merely provides some example embodiments and should not construed as a summary for the entire disclosure.

BRIEF DESCRIPTION OF THE DRAWINGS

The foregoing and other aspects of embodiments are described in further detail with reference to the accompanying drawings, in which the same elements in different figures are referred to by common reference numerals. The embodiments are illustrated by way of example and should not be construed to limit the present disclosure.

DETAILED DESCRIPTION

Figure 1:
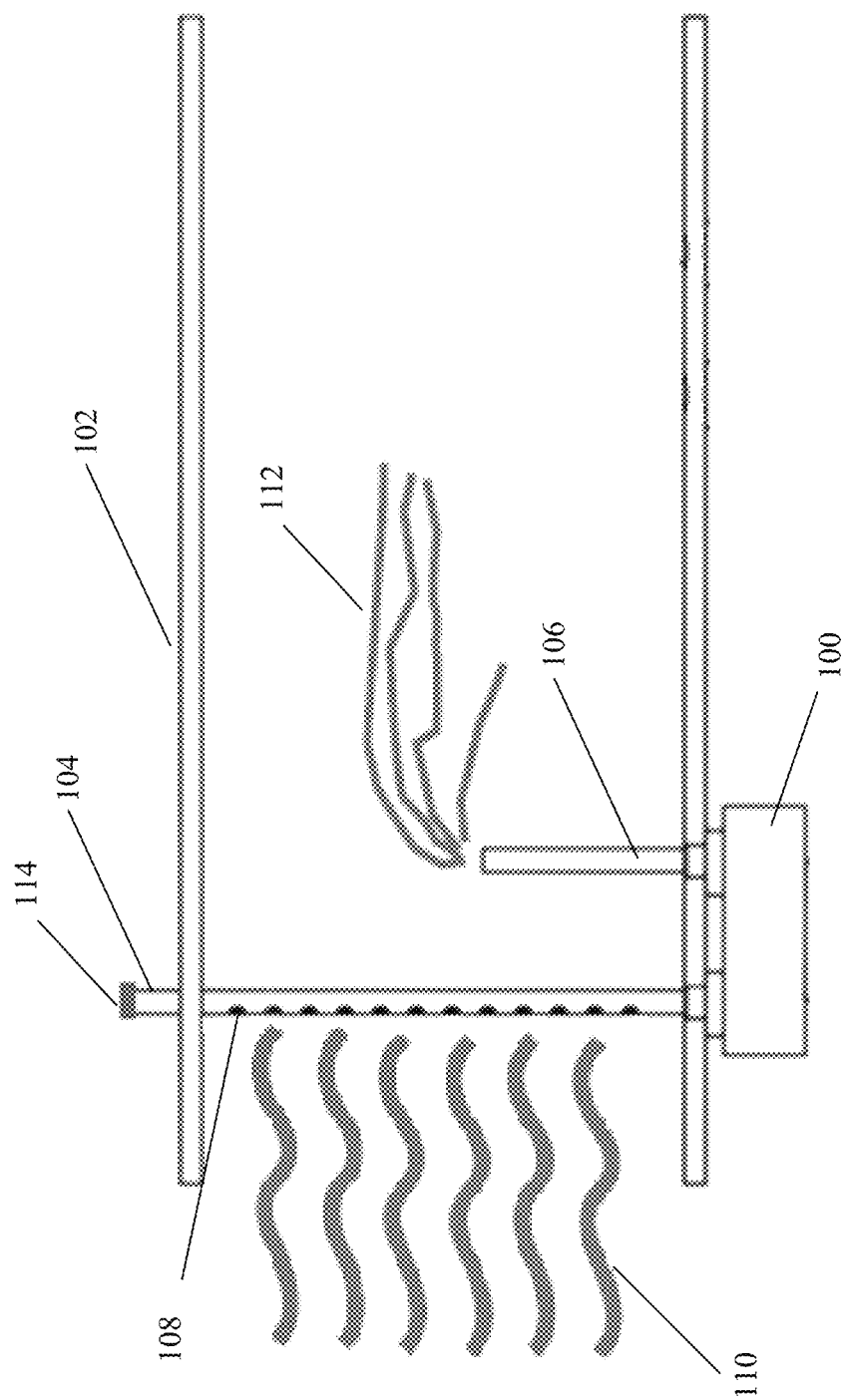
FIG. 1 shows an example of a duct detector as deployed in a ductwork, according to an embodiment.

Duct detectors may be deployed at various locations within a complex ductwork system to detect smoke or other harmful particles and gases. A sensor in the duct detector may detect an adverse condition (e.g., presence of smoke) and, in response, trigger notifications and/or other actions.

As smaller space is being assigned to HVACs and the associated ductwork in commercial buildings, there has been a desire for duct detectors with a smaller footprint. Currently available detectors, however, tend to be bulky and cumbersome. The housing industry furthermore requires the duct detectors to be conveniently repairable and serviceable, attributes which are lacking in existing design of duct detectors. For instance, in existing duct detectors, a repair personnel may have to break a seal to access a component and then repair the broken seal after the component has been serviced. Repeated service may damage the seal permanently and require the entire duct detector to be replaced. Therefore, there is also a desire for duct detectors with an easier repairability and serviceability.

Examples provided herein describe duct detectors that have smaller footprints and yet are easily repairable and serviceable. For a smaller footprint, the duct detectors have a stacked design where the control circuitry is stacked on top of the detection chamber. For an easy repairability and serviceability, the detection chamber is sealed separately, allowing the control circuitry (and other components) to be accessed for repair and service without breaking the seal.

The control circuitry may be integrated into a single printed circuit board (PCB). The detection chamber may be disposed directly below the PCB. The detection chamber may contain a sensor, which may be connected to the PCB, generally on the opposite side to the control circuitry. The barrier between the detection chamber and the control circuitry may be provided by a combination of: (i) the substrate of the PCB itself at the top of the detection chamber, (ii) a detection chamber cover around the detection chamber, and (iii) a sealing gasket at the bottom edge of the detection chamber. The sealing gasket particularly may stop a potential leaking of materials from the detection chamber and damaging the control circuitry.

In some examples, the smoke sensor may operate using photoelectric effect. In other examples, the smoke sensors may operate using the ionization technique. However, these smoke detection techniques are presented as examples, and any kind of smoke detection technique should be considered within the scope of this disclosure. In addition to the smoke sensor, the duct detector may include other sensors such as sensors for carbon monoxide, carbon dioxide, oxygen, refrigerant, and/or temperature. The duct detectors may further include components for monitoring attributes of the air circulating in the ductwork such as airflow and differential pressure.

An HVAC alarm system may have multiple interconnected duct detectors. For instance, a first duct detector may generate an alarm condition that may be communicated to other duct detectors for the receiving duct detectors to trigger visual and/or audible alarms. Some of the interconnected duct detectors may include duct detectors with a reduced functionality, e.g., having a relatively simple control circuitry. The duct detectors with such reduced functionality may exchange communication signals with another duct detector, e.g., functioning as a parent duct detector to the child duct detector with the reduced functionality, for the parent duct detector to perform a more complex analysis on the sensing data from the child duct detector. The child detector may be even smaller than the parent duct detector and can be deployed at even tighter spaces.

FIG. 1 shows an example of a detector 100 installed in a ductwork 102. The installation of detector 100 to the ductwork 102 may be performed by boring one or more holes in the ductwork 102. These bored holes may be used for a sampling tube 104 and an exhaust tube 106. The sampling tube 104, arranged perpendicular to an airflow 110, may span the entire cross-sectional width of the ductwork 102. Several holes 108 in the sampling tube 104 may allow a portion of the airflow 110 to be collected into the sampling tube 104. The sampling tube 104 may therefore sample air flowing through the ductwork 102 for the entire (or at least a large part of) cross-sectional width of the ductwork 102. In some examples, the sampling tube 104 may use Venturi effect to sample the air. To stop the sampled air from escaping in the direction opposite the detector 100, a plug 114 may be used to seal the corresponding end of the sampling tube 104. After the detector 100 analyzes the collected sample, it may be egressed as an exhaust 112 from the exhaust tube 106. The exhaust 112 may then join the airflow 110 in the duct 102, after the analysis has been performed by the detector 100. The analysis of the sampled air may be performed by various components of the detector 100, as described below.

Although the above example describes two mounting holes, one for the sampling tube 104 and another for the exhaust tube 106, detectors 100 that require a single mounting hole should also be considered within the scope of this disclosure. For instance, both the sampling and exhaust mechanism can be integrated into a single tube. This single tube may be partitioned longitudinally in the middle, with a semi-circular profile of a first partition operating as a sampling section and the other semi-circular profile of the second partition operating as an exhaust section. The sampling section may have the holes such as the holes 108 shown in FIG. 1 to collect the air sample, whereas the exhaust section may have a single opening at the end for the exhaust. It should also be understood that the single tube may be formed by two semi-circular tubes attached in the middle. In one or more of these cases, the exhaust section may be shorter than the sampling section.

Figure 2F:
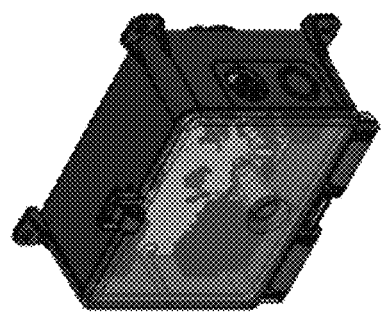
FIGS. 2A-2F show several views of the duct detector, according to an embodiment.
Figure 2D:
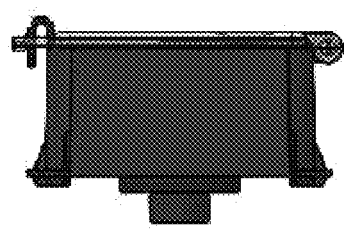
Figure 2C:
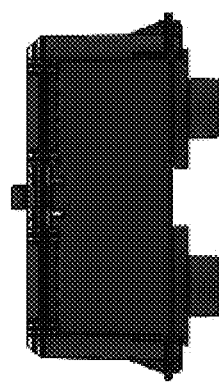
Figure 2A:
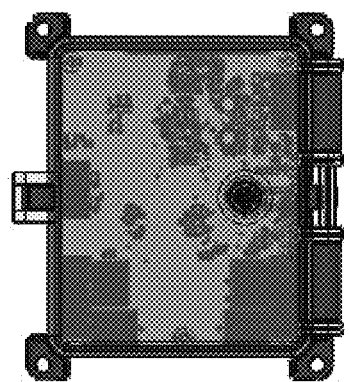
Figure 2E:
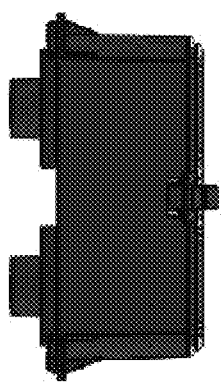
Figure 2B:
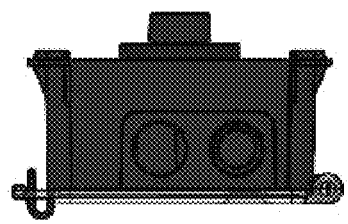

FIGS. 2A-2F show several views of a detector 100. In particular, FIG. 2A shows a top view; FIGS. 2B-2E show side views; and FIG. 2F shows an isometric view. All of these views show that the detector 100 may have a compact design (e.g., approximately square shaped because of the vertical stacking of the detection chamber and the control circuitry) compared to conventional designs (generally rectangular) that have separate, horizontally disposed detection head and logic section.

Figure 3:
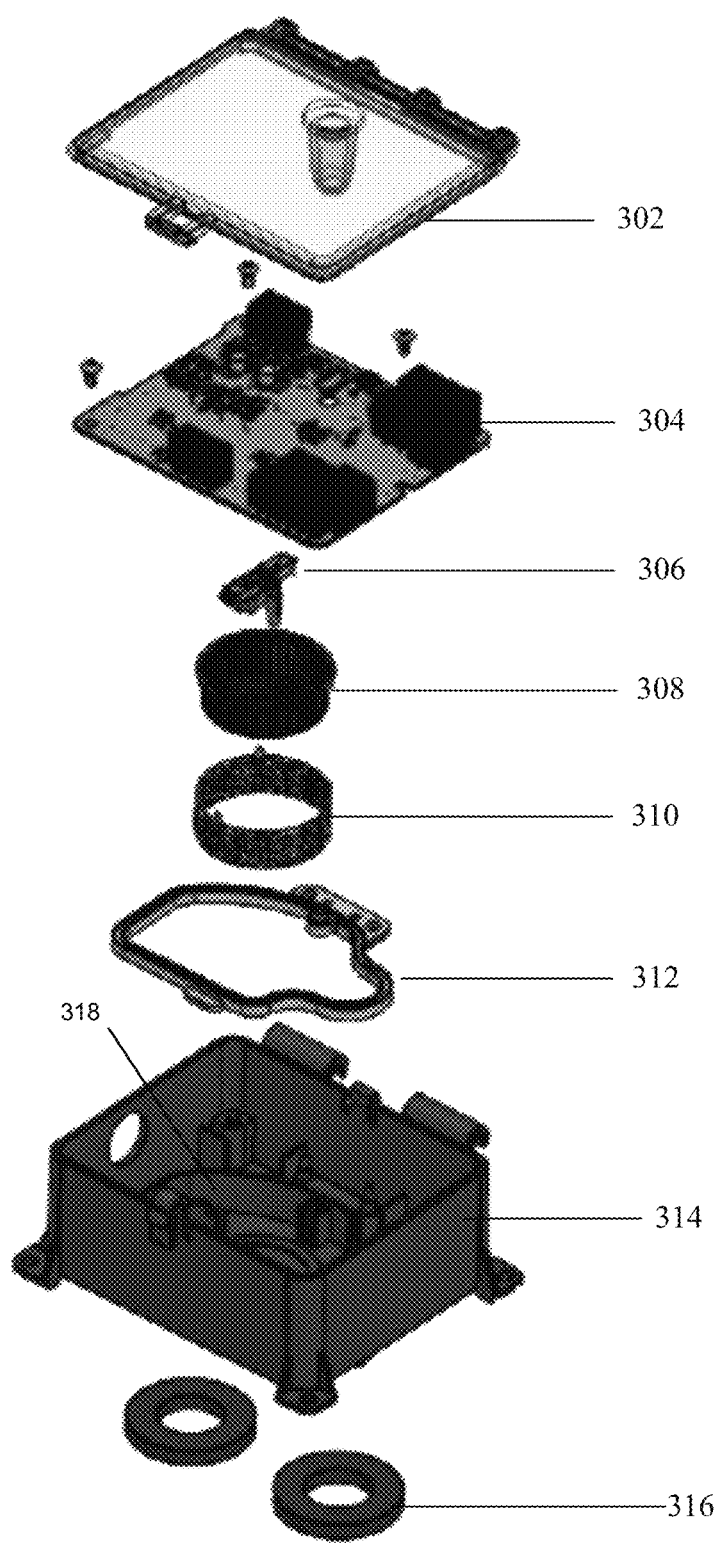
FIG. 3 shows an exploded view showing the components of the duct detector, according to an embodiment.

FIG. 3 is an exploded view of the detector 100 showing its constituent components. The components may include, for example, a top cover 302, a printed circuit board (PCB) 304, a bench assembly 306, a chamber cover 308, a filter screen 310, a sealing gasket 312, a bottom housing 314, and foam gaskets 316. It should be understood that these components are merely exemplary and detectors with additional, alternate, or fewer number of components should be considered within the scope of this disclosure.

Figure 4A:
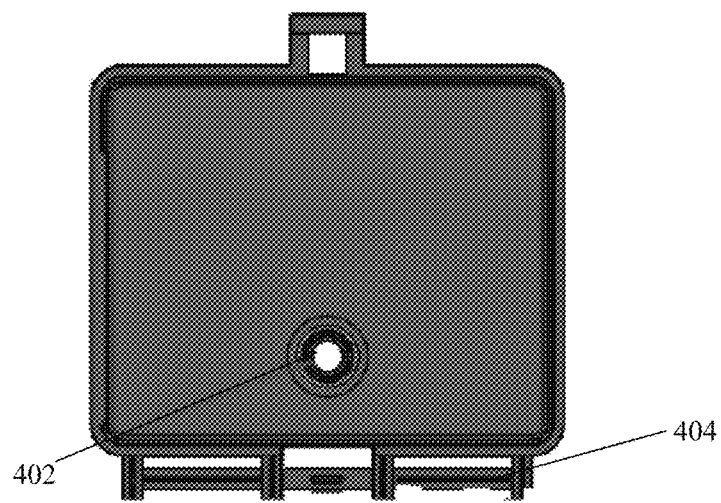
FIGS. 4A-4C show several views of the duct detector's top cover, according to an embodiment.
Figure 4B:
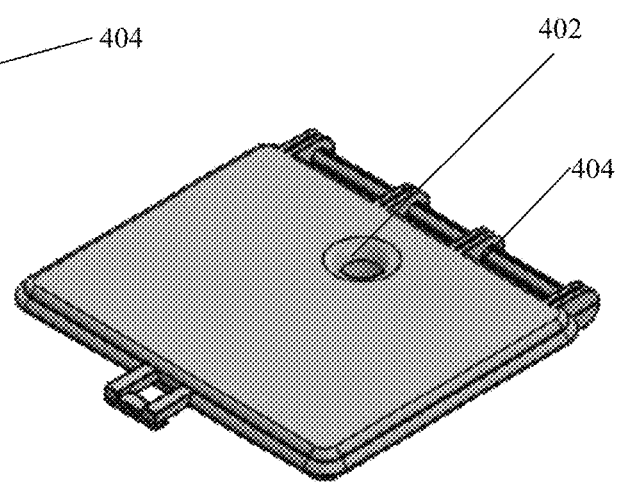
Figure 4C:
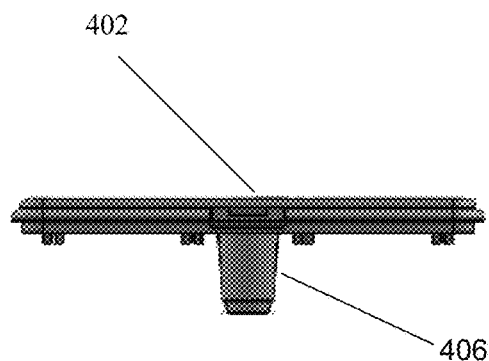

FIGS. 4A-4C show several views of the top cover 302. More particularly, FIG. 4A shows a top view, FIG. 4B shows an isometric view, and FIG. 4C shows a side view. The top cover 302 may protect internal components (e.g., PCB 304) of the detector 100. In some examples, the top cover 302 may be transparent or translucent to provide a visual of the internal components, without necessarily opening the top cover 302. The top cover 302 may also include an opening 402 and guide tube 406 thereunder to provide an access to a TEST and/or RESET buttons in the body of the detector 100 (the buttons may be on the PCB 304, for instance). The top cover 302 may be affixed to the detector 100 (e.g., the bottom assembly 314) using a hinge 404. To access the internal components, repair personnel may swivel the top cover 302 on the hinge 404. The top cover 302 may be made up of any kind of material. For instance, the top cover 302 may be made up of a polycarbonate material.

Figure 5A:
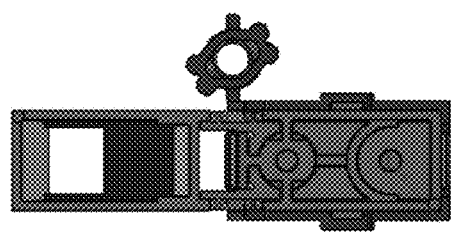
FIGS. 5A-5E show several views of the duct detector's bench assembly, according to an embodiment.
Figure 5B:
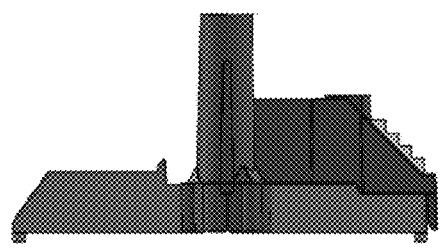
Figure 5C:
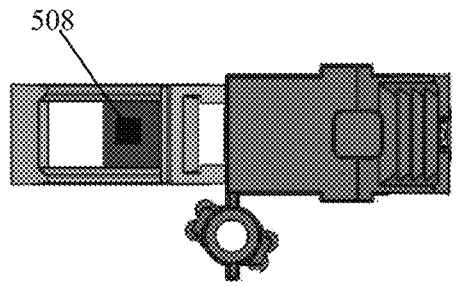
Figure 5E:
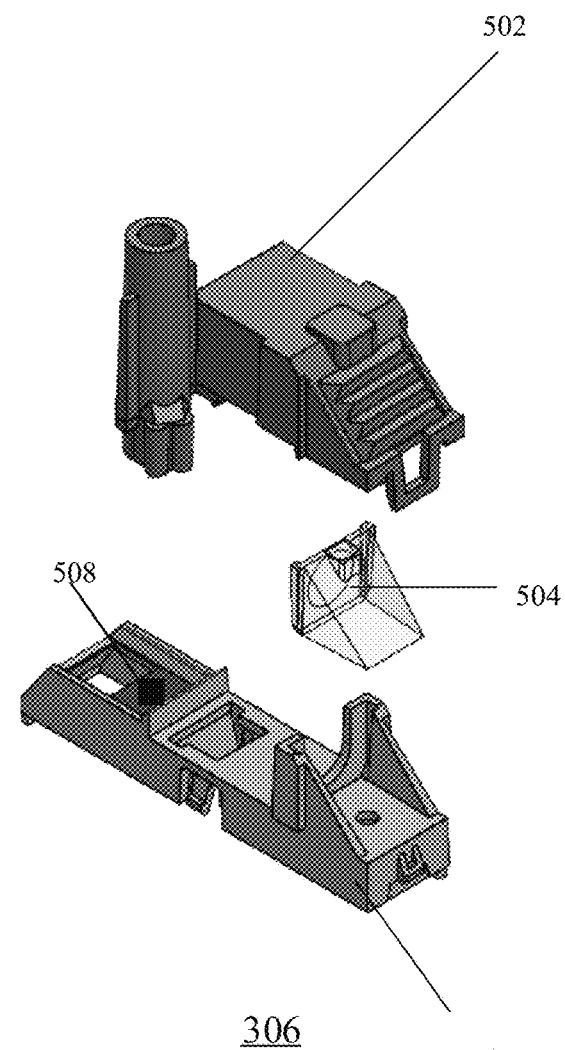
Figure 5D:
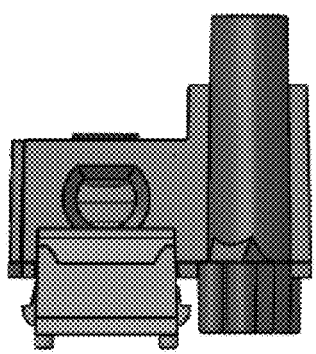

FIGS. 5A-5E show several views of the bench assembly 306. More particularly, FIG. 5A shows a bottom view, FIG. 5B shows a lengthwise side view, FIG. 5C shows a top view, FIG. 5D shows a widthwise side view, and FIG. 5E shows an isometric exploded view. The bench assembly 306, which may be disposed within the detection chamber, may include one or more sensors 508 (e.g., a smoke sensor, temperature sensor) for detecting the presence and/or level of particles (e.g., smoke) in the sampled air; and/or to measure one or more attributes of the sampled air. As shown in FIG. 5E, the bench assembly 306 may be made up of three parts: a top part 502, which may be a PC/ABS (Polycarbonate/Acrylonitrile Butadiene Styrene) blend; a middle part 504, which may be a clear polycarbonate; and a bottom part 506, which may be a PC/ABS blend. The upper portion of the bench assembly 306 may be connected to the PCB 304. In other words, the sensing head of the detector 100 may be integrated with a single PCB 304 design.

Figure 6A:
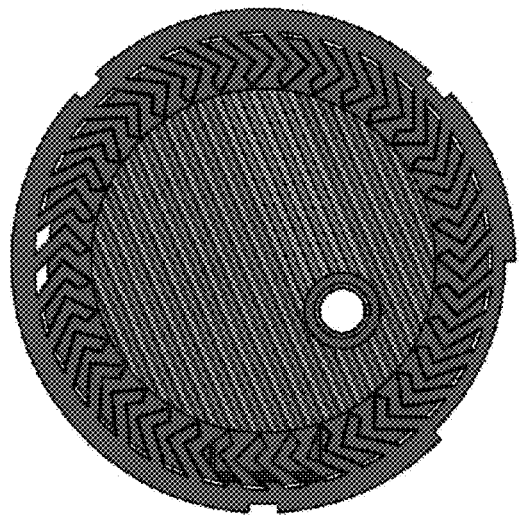
FIGS. 6A-6C show several views of the duct detector's first example chamber cover, according to an embodiment.
Figure 6C:
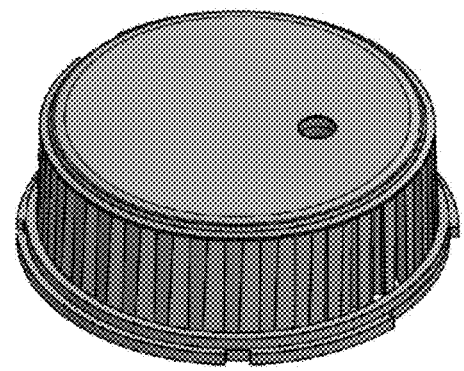
Figure 6B:
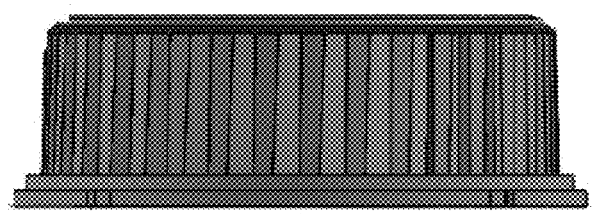
Figure 6D:
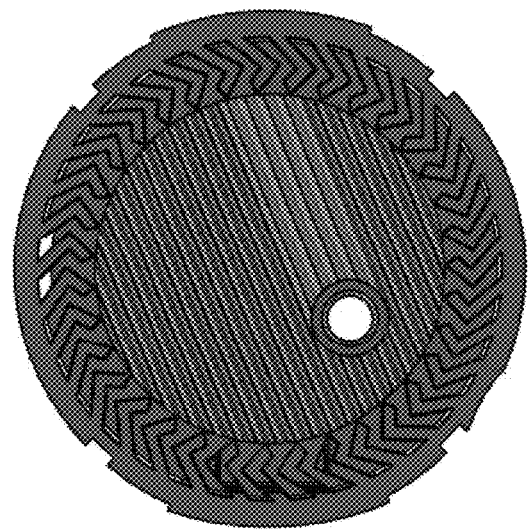
FIGS. 6D-6F show several views of the duct detector's second example chamber cover, according to an embodiment.
Figure 6E:
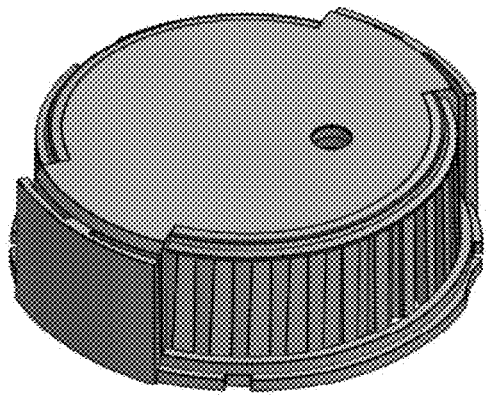
Figure 6F:
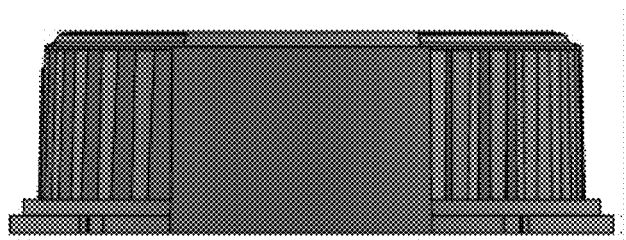

FIGS. 6A-6C show several views of a first example the chamber cover 308 (the first example being referred to as 308a) and FIGS. 6D-6F show several views of a second example of the chamber cover 308 (the second example being referred to as 308b). More particularly, FIG. 6A shows a top view, FIG. 6B shows a side view, and FIG. 6C shows an isometric view of the chamber cover 308a. Similarly, FIG. 6D shows a top view, FIG. 6E shows a side view, and FIG. 6F shows an isometric view of the chamber cover 308b. The chamber cover 308 may define the detection chamber 318—e.g., the chamber cover 308 may form the bottom and side walls within the detection chamber 318 (the PCB 304 may form the top wall of the detection chamber 318). The chamber cover 308 may therefore provide an isolated environment for the sensors in the detection chamber 318 (e.g., sensors 508 in the bench assembly 306) to detect smoke (e.g., presence and/or level of) and/or any other particles in the sampled air; and/or to measure other attributes of the sampled air. In other words, the chamber cover 308 may block the sampled air from leaking to other components of the detector 100. The chamber cover 308 may be composed of, for example, an ABS material, and/or any other plastic material.

Figure 7A:
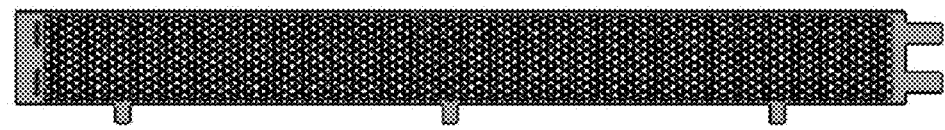
FIGS. 7A-7B show several views of a duct detector's first example filter ring, according to an embodiment.
Figure 7B:
Figure 7C:
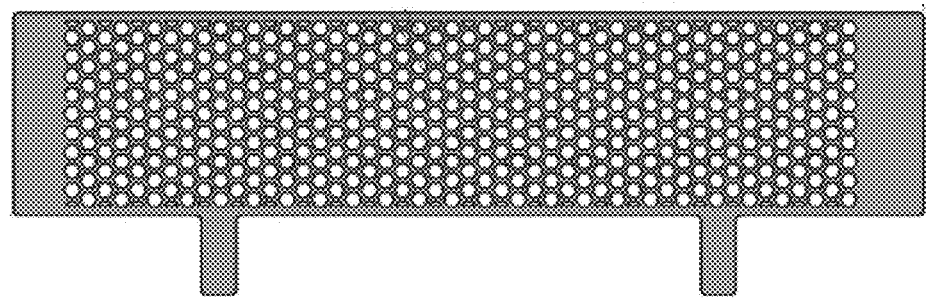
FIGS. 7C-7D show several views of a duct detector's second example filter ring, according to an embodiment.
Figure 7D:
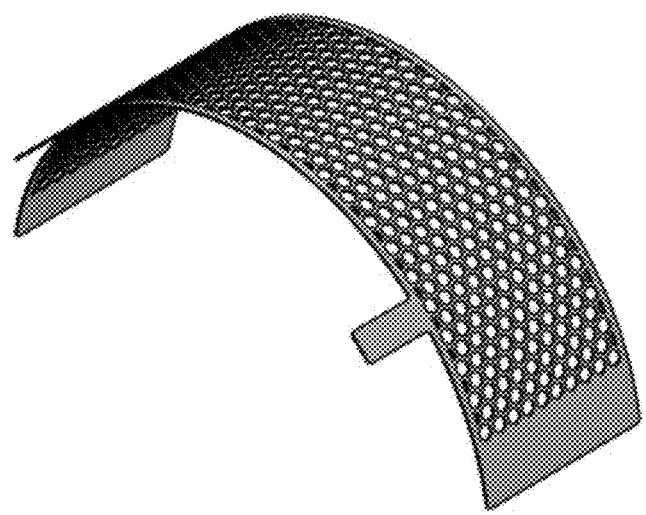

FIGS. 7A-7B show several views of a first example of the filter screen 310 (the first example being referred to as 310a) and FIGS. 7C-7D show several views of a second example of the filter screen 310 (the second example being referred to as 310b). More particularly, FIG. 7A shows a side view of the filter screen 310a when the ends are not connected and FIG. 7B shows an isometric view of the filter screen 310a when the ends are connected to form a circular structure. With regard to the second example, FIG. 7C shows a side view of the filter screen 310b it is not bent in shape, and FIG. 7D shows an isometric view of the filter screen 310b when it is bent in a semi-circular shape. For the first example, when the ends are connected, the filter screen 310a may wrap around the chamber cover 308 to provide structural support for the chamber cover 308. For the second example, two filter screens 310b may be used, each forming a semi circular structural support around the chamber cover 305B. In addition to such structural support, the filter screen 310 (i.e, each of the filter screens 310a and 310b) may filter any harmful material from errant leaks from the detection chamber, if any. The filter screen 310 may be made up of stainless steel (e.g., 300 series stainless steel) and may be plated with nickel.

Figure 8A:
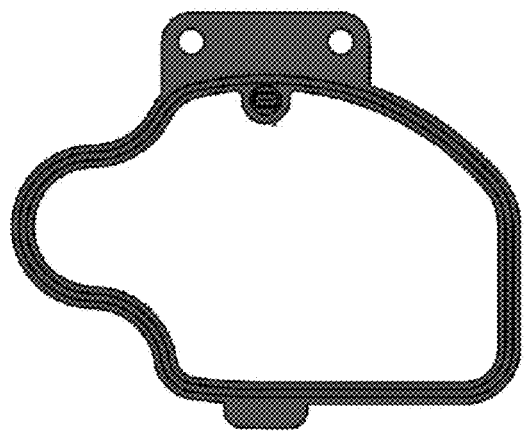
FIGS. 8A-8D show several views of the duct detector's sealing gasket, according to an embodiment.
Figure 8B:
Figure 8D:
Figure 8C:
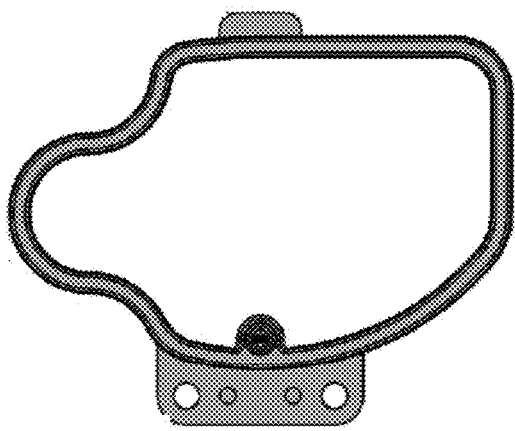
Figure 9A:
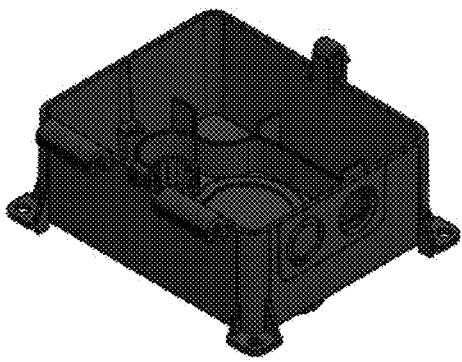
FIGS. 9A-9D show several views of the duct detector's bottom housing, according to an embodiment.
Figure 9B:
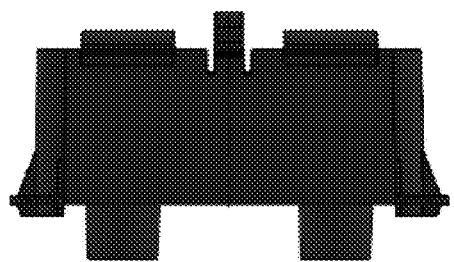
Figure 9C:
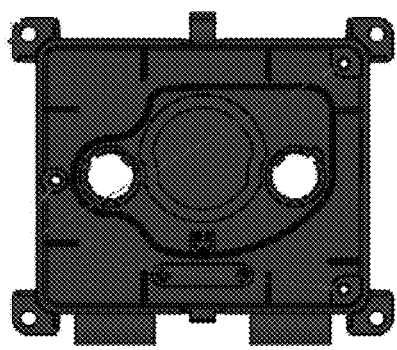
Figure 9D:
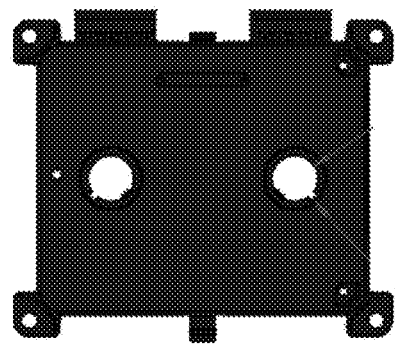

FIGS. 8A-8D show several views of the seal (also referred to as a sealing gasket) 312. More particularly, FIG. 8A shows a top view, FIG. 8B shows a side view, FIG. 8C shows a bottom view, and FIG. 8D shows an isometric view. The seal 312 may be disposed between the PCB 304 and the bottom housing 314 and may surround the detection chamber. The seal 312 therefore may prevent leakage of harmful particles (e.g., smoke) from the sampled air. Furthermore, the seal 312 may also prevent outside gases and materials (other than the sampled air) from entering the detection chamber and thereby may prevent contamination of the sampled air. During repairs or services, the seal 312 may be kept intact because the logic and analysis components (e.g., control circuitry) of the PCB 304 can be accessed without breaking the seal 312. The seal 312 may be made up of rubber (e.g., Thermoplastic Vulcanizates (TPV) rubber).

FIGS. 9A-9D show several views of the bottom housing 314. The bottom housing 314 may provide anchor supports to the components of the detector 100. For instance, the lid 302 may be attached to the bottom housing using the hinge 404. Similarly, the printed circuit board may be anchored to the bottom housing using screws through the seal 312. The bottom housing 314 may also include holes for the sampling tube and the exhaust tube. The detection chamber (e.g., formed by the chamber cover 308) may rest on the bottom housing 314 to receive the air sampled by the sampling tube. Sampled air that has been analyzed in the detection chamber is again egressed to the bottom housing 314 and further onto the exhaust tube. The bottom housing 314 may be made up of ABS material.

Figure 10:
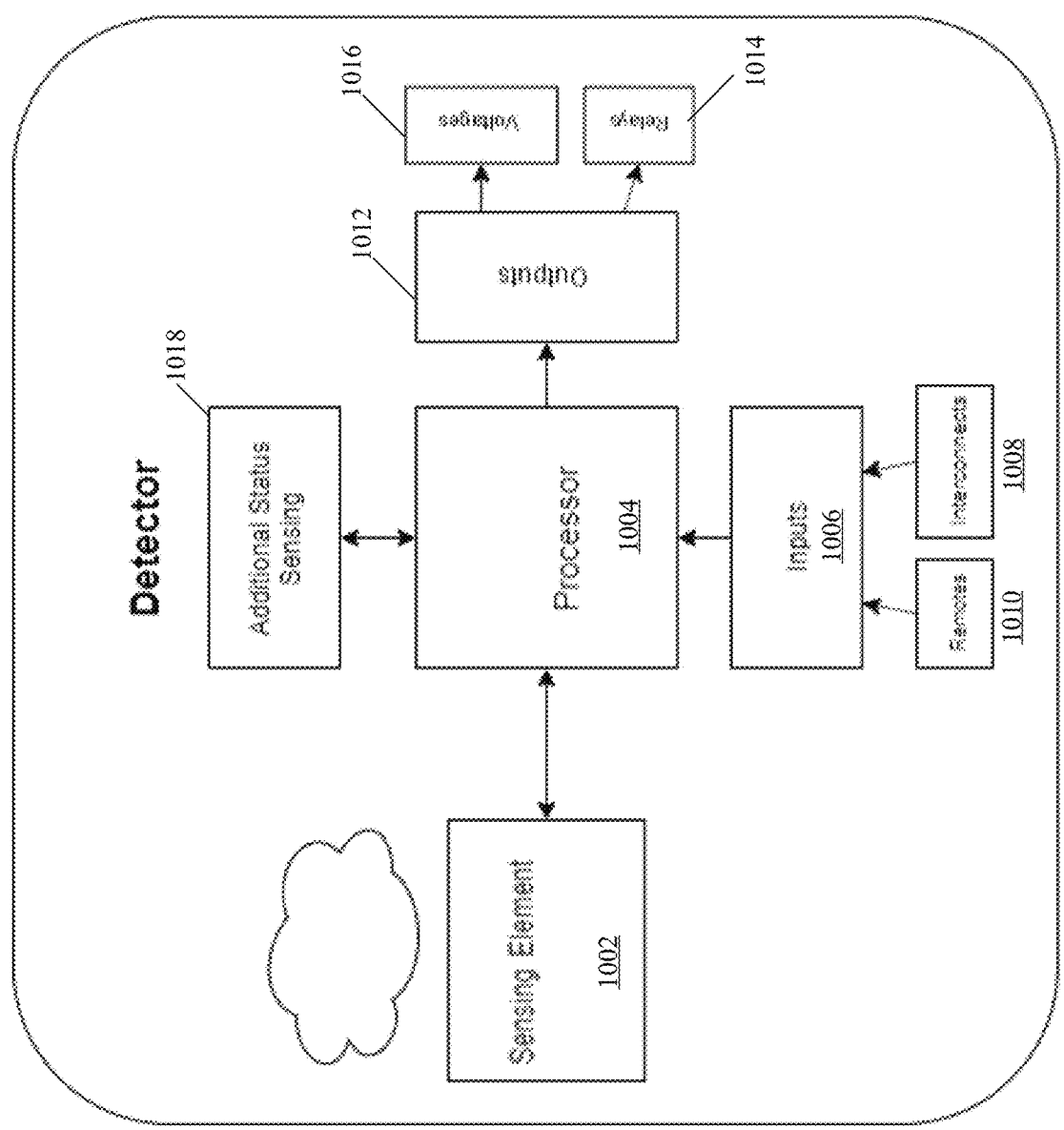
FIG. 10 shows an example architecture of the duct detector, according to an embodiment.

FIG. 10 shows an architecture 1000 of a detector (e.g., detector 100 shown in FIGS. 1-3). The architecture 1000 may include a sensing element 1002, a processor 1004, inputs 1006 that may include interconnect inputs 1008 and remote inputs 1010, and outputs 1012 that may include voltage outputs 1014 and relay outputs 1016. The architecture 1000 may further include additional status sensing component 1018. It should be understood that the architecture 1000 as shown in FIG. 10 and described herein is merely an example, and architectures with additional, alternative, or fewer number of components should also be considered within the scope of this disclosure.

The sensing element 1002 may include any type of sensor, such as a smoke sensor, particle sensor, gas sensor, and/or a combination of different types of sensors. For instance, the sensing element 1002 may include a smoke sensor that may operate according to the principle of photoelectric smoke detection (e.g., multi wavelength photoelectric smoke detection), or according to the principle of ionization smoke detection, or a combination of both. These principles of operation are mere examples, and any kind of principle of operation within the smoke sensor forming the sensing element 1002 should be considered within the scope of this disclosure. The sensing element 1002 may be disposed in a bench assembly (e.g., bench assembly 306 shown in FIGS. 5A-5C). The bench assembly may extend to a detection chamber thereby exposing the sensing element 1002 to the sampled air within the detection chamber. The sensing element 1002 may measure the level of smoke, particles, gases, and/or any other type of attributes of the sampled air in the detection chamber, and thereby generate a measurement of the corresponding level of the detected attribute in the air circulating the ductwork. The sensing element 1002 may then generate a detection signal and transmit the signal to the processor 1004. The detection signal may include a raw measurement by the sensing element 1002, or any other electrical parameter that may be correlated with the level of attribute measured by the sensing element 1002. The processor 1004 may further process the detection signal to determine if there is an alarm condition and/or if other communication and/or control signals are to be generated. For example, the processor 1004 may determine an alarm condition when the level of attribute (e.g., level of smoke) exceeds a predetermined threshold.

The processor 1004 may be any kind of processor that may control the overall functionality of the detector. To that end, the processor may send signals (e.g., control signals) to and receive data (e.g., measurement data) from the sensing element 1002. The control signals may include, for example, signals to calibrate the sensing element 1002, or signals to activate a sensor in the smoke element 1002. The data from the sensing element 1002 may include, for example, a continuous stream of the level of a corresponding attributes in the sampled air, as detected by the sensing element 1002. The data from the sensing element 1002 may include, for example, an electrical paramter such as a current level that may correlate with the level of corresponding attribute in the sampled air.

The additional status sensing element 1018 may include other sensors such as carbon monoxide (CO) sensors, carbon dioxide ($CO_2$) sensors, oxygen ($O_2$) sensors, volatile organic compounds sensors (VOCS), dust sensors, and/or any other types of sensors that may detect any type of gases and/or particles in the sampled air. The addititional status sensing element 1108 may also have components similar to the sensing element 1002. Additionally or alternatively, the additional status sensing element 1018 include sensors that may measure attributes of the sampled air, attributes such as temperature, humidity, etc. The additional sensing element 1018 may also include monitors for differential pressure in the ductwork and/or airflow through the ductwork. The additional sensing element 1018 may also include a sensor for measuring the level of refrigerant (which may be from a leakage) in the sampled air. The measured data may be transmitted by the additional status sensing element 1018 to the processor 1004. It should be understood that the different attributes measured by the sensing element 1002 and the additional status sensing element 1018 are provided as examples, and should not be considered limiting. In some examples, the sensing element 1002 and the additional status sensing element 1018 may be similar and may measure the same attribute at different points. In other examples, the additional status sensing element 1018 may be a back-up sensor that may take over the functionality of the sensing element 1002 if the sensing element 1002 malfunctions. Furthermore, the sensing element 1002 and the additional status sensing element 1018 may be used to calibrate each other.

The inputs 1006 may include any inputs (e.g., inputs other than the measurement data from the sensing element 1002 and the additional status sensing element 1018) to the detector. As shown, the inputs 1006 may include the interconnect input 1008 and the remote input 1010. The interconnect input 1010 may be connected to other detectors and/or to a control panel (e.g., fire alarm control panel, FACP). A threshold voltage detected at the interconnect input 1008 may indicate that an alarm condition is triggered at least another detector. For example, a voltage of 18 V detected at the interconnect input 1008 may indicate a global shutdown condition, and a voltage of 24 V detected at the interconnect input 1010 may indicate a global shutdown with a reset condition. The remote input 1010 may receive signals from other detectors (e.g., a master detector) or the control panels. The signals may be series of voltage pulses, which may control signals and/or measurement data generated by other detectors.

The outputs 1012 may include any type of output that may indicate an alarm condition at the detector and/or signals for one or more components to shut down. Examples of the outputs 1012 may include a relay output 1014 and a voltage output 1016. The relay output 1014 may indicate an alarm condition at the detector, e.g., a normally closed alarm relay contact may be thrown into a closed position upon detecting the smoke thereby generating the voltage at the relay output 1014. The voltage output 1016 may generate voltage as signals to control other components in the system. For instance, in response to an alarm condition, the processor 1004 may cause the voltage output 1016 to generate a signal to shut off the HVAC system and/or actuate dampers within the ductwork.

Figure 11:
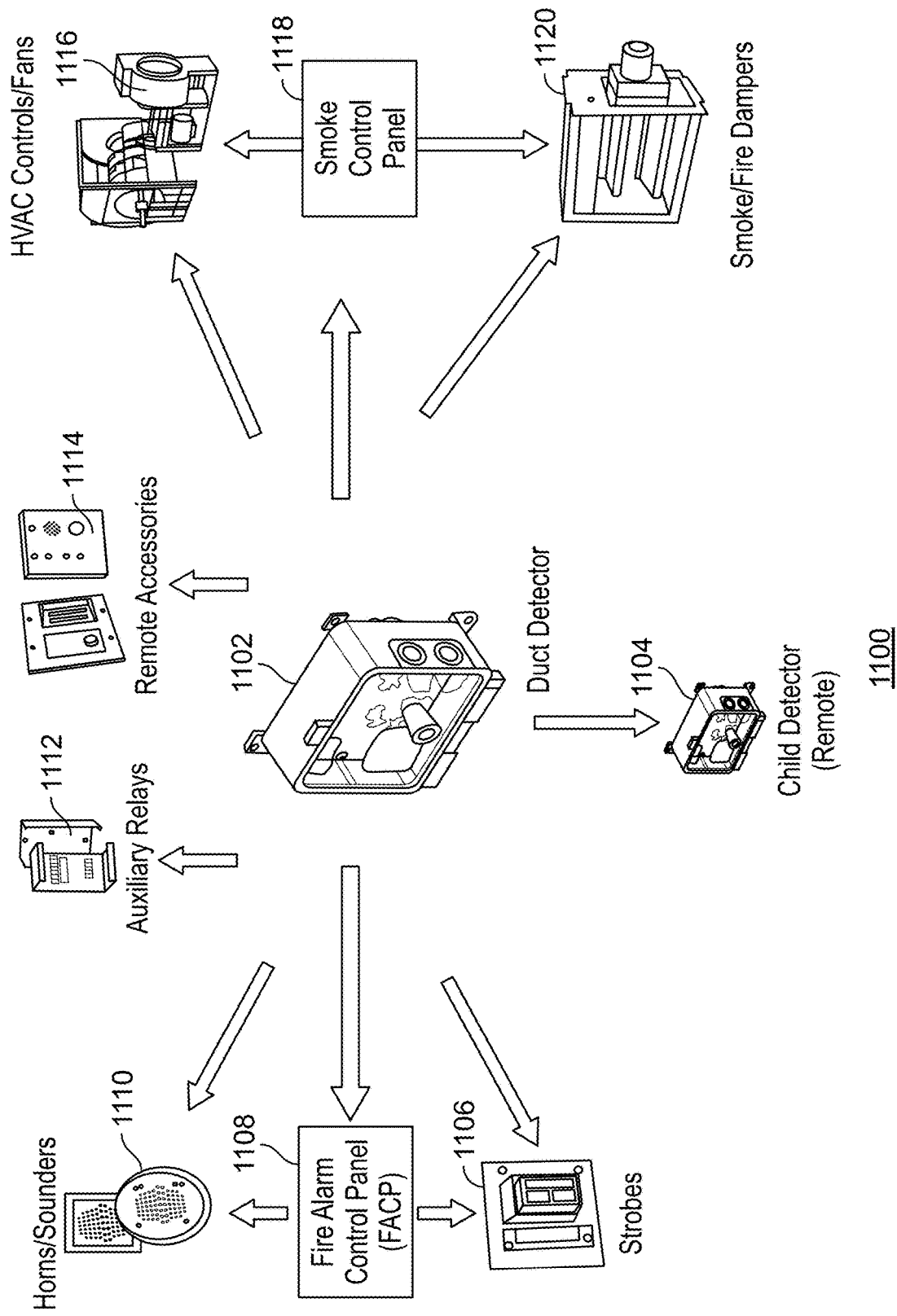
FIG. 11 shows an example HVAC alarm system that uses the duct detector, according to an embodiment.

FIG. 11 shows an example of an HVAC alarm system 1100. The HVAC alarm system 1100 may include components such as a duct detector 1102 (e.g., duct detector 100 shown in FIGS. 1-3), a child detector 1104 that may be remote from the duct detector 1102, strobes 1106, fire alarm control panel (FACP) 1108, horns/sounders 1110, auxiliary relays 1112, remote accessories 1114, HVAC controls/fans 1116, smoke control panel 1118, and smoke/fire dampers 1120. It should however be understood that these are just example components and alarm systems with additional, alternate, and/or fewer number of components should also be considered within the scope of this disclosure.

The duct detector 1102 may be any type of duct detector such as the duct detector 100 shown in FIG. 1. The duct detector 1102 may generally have a detection chamber for detecting level of smoke, harmful gases and/or other attributes of sampled air. The duct detector 1102 may further have a control circuitry (e.g., a PCB) that may analyze and process the detection data generated by one or more sensors in the detection chamber. The control circuitry may be vertically above the detection chamber thereby making the duct detector more compact than the currently available duct detectors. Furthermore a sealing gasket (e.g., a rubber seal) may separate the detection chamber from the control circuitry such that particles from the detection chamber may not leak and damage the control circuitry. This design of the duct detector 1102 may also allow the control circuitry to be serviced or repaired without damaging the sealing gasket.

The duct detector 1102 with the control circuitry, the detection chamber, and input/output interconnects may be considered a parent unit with full functionality. For instance, the duct detector 1102 may process and analyze the sensor data locally, receive communications from other detectors and components, process the received communication signals, generate communication signals for control panels, and generate control signals for HVAC actuators (e.g., smoke dampers). The child detector 1104 may then have a partial functionality compared to the duct detector 1102. More specifically, the child detector 1104 may have a reduced local processing power and have a fewer number of input/output components. The child detector may however communicate with the duct detector 1102, which may be operating as a parent detector for the child detector 1104.

The child detector 1104 with reduced functionality may allow for a cheaper and a more compact detector compared to the duct detector 1102. The duct detector 1102 may control (e.g., by sending control signals to) the child detector 1104 for the child detector to perform sensing in coordination with the duct detector 1102. For instance, a duct detector 1102, upon detection of smoke in the air circulating through the ductwork may ping a downstream child detector 1104 to determine the rate of dispersion of smoke through the ductwork. Alternatively, the child detector may detect a hazardous smoke level and communicate with the duct detector 1102, which may perform additional functionality (e.g., generating a control signal) based on the hazardous smoke level detected by the child detector 1104.

The child detector 1104 may be remote from the duct detector 1102, and the communication between these components may be through any kind of wired or wireless technology. For instance, the duct detector 1102 may communicate through power line communication using voltage pulses to transmit and receive data. As another example, they may communicate using wireless signals (e.g., radio frequency signals).

With regard to the other components, the strobes 1106 may be any kind of lighting mechanism that may indicate an alarm condition. The duct detector 1102, in some examples, may communicate with the strobes 1106 directly based on detecting an alarm condition, and the strobes 1106 may light up (e.g., produce a flashing light) in response to receiving the communication. In other examples, the duct detector 1102 may communicate with the FACP 1108 to indicate an alarm condition and the FACP 1108 may provide a communication signal to the strobes 1106 to light up.

The FACP 1108 may include any kind of fire control panel that may communicate with multiple detectors 1102, strobes 1106, horns/sounders, and/or any other components in the system 1100 that are associated with generating and/or mitigating fire alarm conditions. The FACP may be wall mounted and may be remote from the other components. The FACP 1108 may communicate with the other components through wired and/or wireless communication means. The interface (e.g., buttons, touchscreens) provided by the FACP 1108 may be used to configure different attributes (e.g., sensitivity, communication preferences) of the components in the system 1100.

The horns/sounders 1110 may include any kind of device that may generate audible signals in response to alarm condition. For instance, the duct detector 1102 may detect an alarm condition and send a communication to the horns/sounders 1110 indicating the alarm condition. In response, the horns/sounders 1110 may generate human audible sound (e.g., warning message, siren-type sound). In other instances, the duct detector 1102 may send the communication signal indicating the alarm condition to the FACP 1108 and the FACP may send the communication signal to the horns/sounders 1110 to generate the audible signals.

The auxiliary relays 1112 may be used by the duct detector 1102 to communicate with other components in the system 1100. For instance, the auxiliary relays 1112 may be provide a connection hub for the duct detector 1102, other duct detectors (not shown), and/or any type of components in the system 1100. Using the auxiliary relays 1112, the duct detector may communicate alarm conditions or provide the communication and/or control signals to the other components.

The remote accessories 1114 may include any kind of components that may remotely interact with the duct detector 1102. For instance, the remote accessories 1114 may include a wall panel with TEST and RESET buttons, which may be used for interacting with the duct detector 1102. The interface of the wall panel may include LED indicators to indicate, for example, a normal condition or an alarm condition. The remote accessories 1114 may also provide connection interfaces for the duct detector 1102 to connect with other devices in the system 1100. For instance, the remote accessories 1114 may provide a port to connect an alarm sounder. In general, the remote accessories 1114 may provide the users with an access to the duct detector 1102 without the hassle of physically getting to the duct detector 1102 itself.

The HVAC control/fans 1116 may include any kind of control mechanism in the HVAC system. The HVAC controls may include, for example, a thermostat unit that shuts off the HVAC in response to receiving a signal from the duct detector 1102. In other words, air circulating through the ductwork may be stopped by shutting down the HVAC system in response to detecting smoke or any other alarm condition. Furthermore, in response to signals from the duct detector 1102, one or more fans may be turned off to stop the flow of the smoke through the ductwork. In some instances, one or more fans may be turned on to deflect the flow of smoke away from rooms or the places where people may be present.

The smoke control panel 1118 may provide an interface for controlling the HVAC system and/or the smoke/fire dampers 1120. The smoke control panel 1118 may provide an interface (e.g., buttons, touchscreen) for the user to set various attributes of for the HVAC system. The attributes may include, for instance, target temperature for the HVAC system, fan speed, or mode (heat/cool) for HVAC system. The smoke control panel 1118 may also receive signals (e.g., signals indicating an alarm condition) from the duct detector 1102.

The smoke/fire dampers 1120 may be mechanical components that may stem the flow of smoke or fire through the ductwork. For instance, upon detection of smoke, the duct detector may transmit a control signals to an actuator associated with the dampers 1120. The actuator may in turn cause the dampers to close, thereby stopping a downstream flow of the circulating air. In some examples, the smoke control panel 1118 may provide the control signal to the smoke/fire dampers 1120 in response to receiving an alarm condition from the duct detector 1102. Although the damper mechanism is shown and described herein, any kind of mechanism that stems the downstream flow of the circulating air should be considered within the scope of this disclosure.

Therefore, the duct detector 1102 may interact with components of an HVAC system for detecting fires and/or any other hazardous condition (e.g., high level of CO). In response to the detection, the duct detector 1102 may also assist in mitigating the hazardous condition, e.g., by shutting down the HVAC system and/or by activating dampers. The duct detector 1102 may therefore ensure fire safety not only by detecting a hazard condition, but also by actively functioning to mitigate the hazard condition.

The duct detector may 1102 may further aid HVAC power management. The duct detector may measure the relative concentration of oxygen and carbon-dioxide in the air circulating through the ductwork. The measured relative concentration may be used by a processor (e.g., a processor within a building automation control system) to determine the presence of people within different parts of th building. For example, areas near the ductwork where a higher concentration than normal of the oxygen is measured, it may be determined that there are no people in the area and therefore no air conditioning may be needed. On the other hand, if there is a higher concentration than normal of carbon dioxide is measured by the duct detector 1102 in an area, the processor may determine that there are people in the area requiring air conditioning. Therefore, using the duct detector 1102, any type of system (e.g., a HVAC system) can manage power within the system to provide conditioned air to different areas on a need to basis, as inferred from the measuredments from the duct detector 1102.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s)

how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A detector comprising:
a detection chamber configured to receive an air sample;
a sensor configured to detect an attribute of the air sample and generate a detection signal based on the detected attribute;
a control circuitry configured to receive the detection signal and generate a communication signal or a control signal based on the received detection signal, wherein the control circuitry is vertically disposed above the detection chamber, wherein the control circuitry comprises a printed circuit board forming a top wall of the detection chamber, and wherein the sensor is attached to a bench assembly at a bottom surface of the printed circuit board;
a sealing gasket that seals the control circuitry from the detection chamber, the sealing gasket being disposed between the bottom surface of the printed circuit board and a bottom housing of the detector; and
a top cover affixed to the bottom housing on a hinge and configured to swivel on the hinge and allow access to the printed circuit board without damaging the sealing gasket.

2. The detector of claim 1, wherein the attribute comprises at least one of airflow, differential pressure, temperature, or humidity.

3. The detector of claim 1, wherein the sealing gasket comprises rubber.

4. The detector of claim 1, wherein the air sample is extracted through Venturi effect.

5. The detector of claim 1, wherein the attribute comprises a level of gas in the air sample.

6. The detector of claim 5, wherein the gas comprises at least one of carbon monoxide, carbon dioxide, or oxygen.

7. The detector of claim 1, wherein the detected attribute comprises a particle level in the air sample.

8. The detector of claim 7, wherein the particle comprises smoke.

9. The detector of claim 7, wherein the sensor is configured to detect the particle level in the air sample using at least one of photoelectric particle detection or ionization particle detector.

10. The detector of claim 7, wherein the control circuitry is configured to generate the communication signal or the control signal in response to the control circuitry determining that the particle level exceeds a predetermined threshold.

11. The detector of claim 10, wherein the communication signal indicates an alarm condition that the particle level has exceeded the predetermined threshold.

12. The detector of claim 11, wherein the control circuitry is configured to transmit the control signal to one or more actuators in an HVAC system associated with the detector.

13. A system comprising:
a first detector configured to operate as a parent detector and a second detector, in communication with the first detector and configured to operate as a child detector, the first detector comprising:
a detection chamber comprising a first sensor configured to detect a first attribute in a first air sample;
a control circuitry disposed vertically above the detection chamber and configured to generate first signal based on the detected attribute, wherein the control circuitry comprises a printed circuit board forming a top wall of the detection chamber, and wherein the first sensor is attached to a bench assembly at a bottom surface of the printed circuit board;
a sealing gasket that seals the control circuitry from the detection chamber, the sealing gasket being disposed between the bottom surface of the printed circuit board and a bottom housing of the detector;
a top cover affixed to the bottom housing on a hinge and configured to swivel on the hinge and allow access to the printed circuit board without damaging the sealing gasket;
the second detector comprising:
a second sensor configured to detect a second attribute in a second air sample; and
the control circuitry in the first detector configured to:
generate a second signal based on the second attribute detected by the second sensor.

14. The system of claim 13, wherein the control circuitry in the first detector is configured to transmit a control instruction to the second detector.

15. The system of claim 13, wherein at least one of the first signal or the second signal indicates an alarm condition.

16. The system of claim 13, wherein at least one of the first signal or the second signal comprises a control signal to an HVAC actuator.

* * * * *